UNITED STATES PATENT OFFICE.

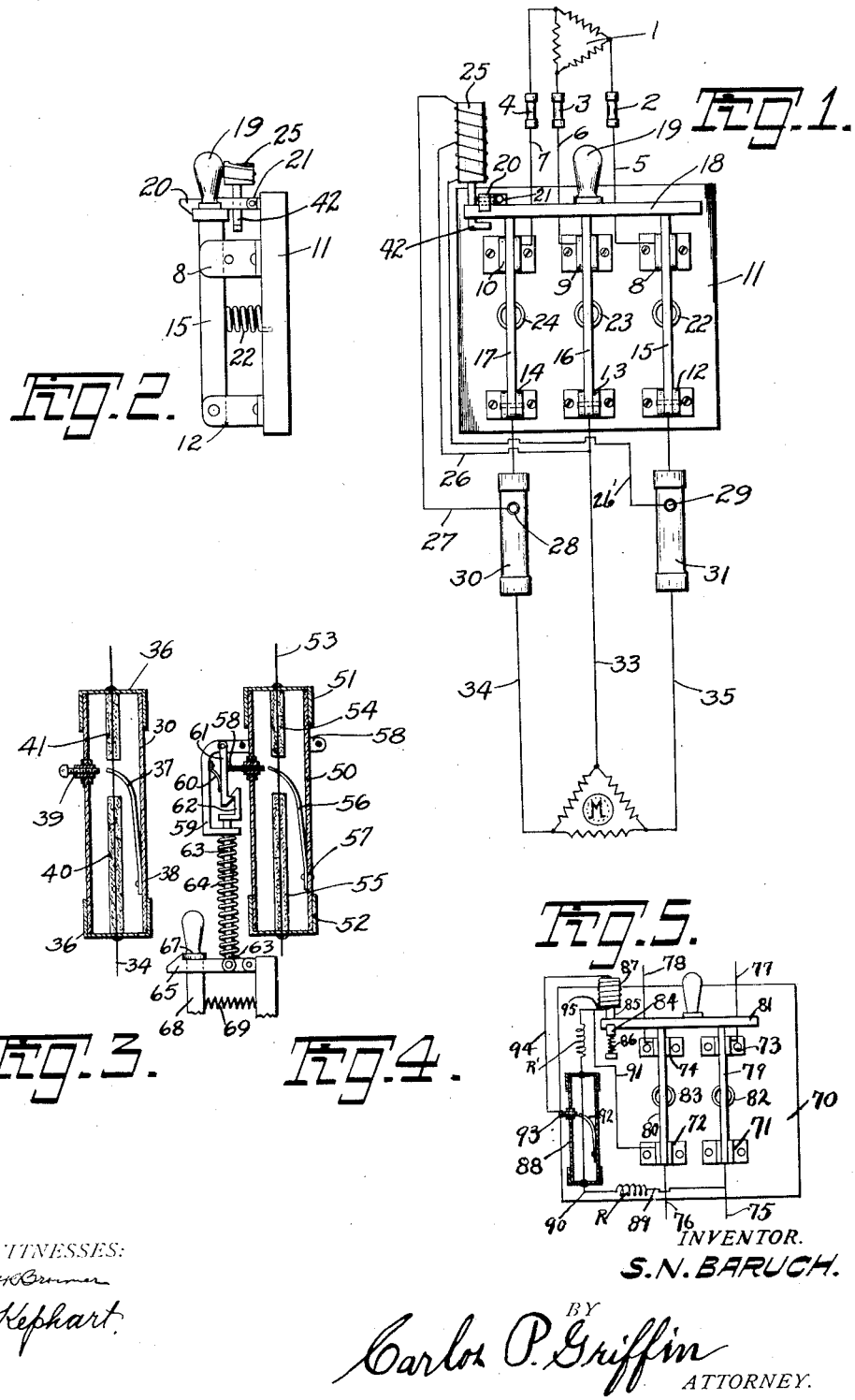

SYDNEY N. BARUCH, OF SAN FRANCISCO, CALIFORNIA, ASSIGNOR TO BARUCH ELECTRIC CONTROLLER CORPORATION, OF SAN FRANCISCO, CALIFORNIA, A CORPORATION OF CALIFORNIA.

ELECTRIC-CIRCUIT PROTECTOR.

1,352,044.  Specification of Letters Patent.  Patented Sept. 7, 1920.

Application filed April 12, 1915. Serial No. 20,756.

*To all whom it may concern:*

Be it known that I, SYDNEY N. BARUCH, a citizen of the United States, residing at San Francisco, in the county of San Francisco, State of California, have invented a new and useful Electric-Circuit Protector, of which the following is a specification in such full and clear terms as will enable those skilled in the art to construct and use the same.

This invention relates to a thermo protector for electric apparatus especially illustrated with a three phase motor. It is applicable to any electric circuit.

This invention relates to a modified form of the apparatus shown and described in my United States Patent No. 1,281,482, dated October 15, 1918, and its object is to produce an apparatus which will operate with a smaller time factor than that shown in the aforesaid application.

It is commonly known to those skilled in the art that when a three phase motor starts up it takes several times its normal full load running current or amperage and should an attempt be made to start the motor with one fuse out leaving but a single phase in circuit with the motor, it would continue to take several times its normal running current without starting up. The temperature produced by this overload current would destroy the insulation on the conductors of the motor. Likewise, should the motor be running and one of the fuses be blown out after the motor has started either in the primary or secondary circuits the motor perhaps if a large one would continue to run but would take through the single phase in circuit twice its normal full load current capacity and also burn out.

An object of this invention is to provide a device which will operate to open the circuit of an electric motor or other apparatus, when the current in said circuit reaches a value which is deleterious to the winding of the motor or other apparatus.

Another object of the invention is to provide an apparatus which is operated by the heating effect of the current in an electric circuit to open said circuit when the temperature of apparatus in the circuit approaches a deleterious temperature.

The heating characteristics of a wire passing current are determined by the conditions surrounding said wire, i. e., if the wire is so placed that the escape of heat therefrom is retarded or reduced its carrying capacity is reduced in the same proportion and vice versa. In a motor the heat is dissipated by the air currents, the frame of the motor, etc. With the present apparatus the electrical conductor is installed in an insulated chamber so that the heat is retained therein keeping the apparatus at slightly higher temperature than the motor with which its winding is in series. In order to protect a three phase, an Edison three wire system, or two phase three wire system, two elements are used in order to get full protection and on all single circuits only one element is used. The device may be used to set off an alarm or to cut off the current altogether as may be desired.

An embodiment of the invention is shown in the drawing in which the same reference numeral is applied to the same portion throughout, but I am aware that there may be many modifications thereof.

Figure 1 is a diagrammatic view of a three wire electric circuit having this cutting out apparatus applied thereto, Fig. 2 is a side elevation of the switch illustrated in Fig. 4, Fig. 3 is a vertical sectional view of this cutting out apparatus, Fig. 4 is a sectional view of a slightly modified form of cutting out apparatus in which a mechanical trigger is used in the place of the electrical releasing device illustrated in Figs. 1 to 3 inclusive, and Fig. 5 is a diagrammatic front elevation of a switch with a no voltage release control.

This invention seeks to make use of the expansion of a wire which itself furnishes the mechanical means for operating the cutting out apparatus.

In the figures the numeral 1 indicates the generator having suitable wires extending to the fuses, 2, 3 and 4 from which fuses the wires 5, 6 and 7 extend to the contact plates 8, 9 and 10, which plates are mounted on the common form of switch block 11. At the bottom of the switch block 11 there is a plurality of ears 12, 13 and 14 of a common form for the support of the pivoted knives 15, 16 and 17 which form the means for connecting the circuits. These knives are connected at their upper ends by the cross bar 18 and have an operating handle 19. The cross bar 18 extends to one side of the knife 17 and it is locked in the given position by means of a swinging latch 20 pivoted to the block 11 at 21. Springs 22, 23 and 24 are used which normally disengage the knife if the latch 20 is raised and this latch is raised by energizing the magnet 25 by sending current through the circuit wires 26, 26' and 27, the latter two of which are connected with the binding posts 28 and 29 on the protective apparatus 30 and 31. The wire 26 is connected with the center of the coil 25 while the wires 26' and 27 are connected to opposite ends thereof. The wire 26 is connected with the wire 33 and the wires 34 and 35 pass into the bottom of the protective devices and out at the top to connect with the switch knives.

The protective apparatus comprises a porcelain tube 30 having metal caps 36 at opposite ends. The wire 34 passes through the two metal caps and is soldered or otherwise permanently secured to each of them, said wire also passing through a hole in a spring 37. The spring 37 is secured to the inside of the porcelain tube at 38 and in its normal position it would contact with a set screw 39 secured in the side of the porcelain tube 30, but which wire is pulled up tight enough to prevent it from touching the set screw 39, unless the heat due to the current passing therethrough should slacken it sufficiently to allow the spring 37 to touch said set screw 39.

In order to accumulate some of the heat in the wire itself the wire is covered with asbestos insulation 40 and 41 which tends to retain some of the heat and thereby increase the expansion.

In operation whenever the load on the motor M becomes too great and the quantity of current passing is heavy enough to cause the wire 34 within the casing 30 to relax enough to permit the spring 37 to touch the set screw 39 a current will pass through the magnet 25 and the armature 42 will be drawn up rapidly enough to cause the latch 20 to be disengaged from the cross bar 18 thereby allowing the springs to push the switch knives out of contact and break the circuit.

In Fig. 4 there is shown a slightly modified form of the invention in which the porcelain tube is indicated at 50, said tube having metal caps 51 and 52 through which the wire 53 extends. This wire is covered with asbestos or other heat retaining material 54 and 55 and a spring 56 is secured within the porcelain tube 57 while the wire prevents said spring from bearing upon the plug 58. The tube supports a suitable clamped bracket 58' having a depending portion 59 which bracket has a spring 60 secured thereto bearing on a small pawl 61, which pawl is adapted to engage a hook 62 at the upper end of a rod 63 on which is wound a spiral spring 64.

The rod 53 is pivoted to a latch 65 and tends to cause it to be disengaged from the cross bar 67 of the knife switch 68, said switch being pushed normally out of contact by means of the spring 69.

In this form of the invention the heat accumulating in the tube and insulation causes the wire 53 to expand whereupon the spring 56 pushes the fiber block 58 outwardly and thereby disengages the hook 61 and allows the spring 64 to push down on the latch 65 thereby releasing the switch, provided the current is heavier than that allowed for in the adjustment of the device.

In the form of the invention shown in Fig. 5, 70 indicates the switch block on which are mounted the terminals 71 to 74 to which the wires 75 to 78 are connected. The switch blades 79 and 80 are pivotally connected to the terminals 71 and 72 in a well known manner, a bar 81 connecting them at the top. Springs 82 and 83 tend to hold the switch open while a latch 84 on the lower end of the armature 85 locks the switch closed. The armature is normally pulled down by the spring 86 while the magnet 87 holds the armature up when energized.

In this case the protective apparatus 88 takes its current through a wire 89, resistance R, wire 90 and wire 91, the heat generated being sufficient to allow the spring 92 to close the connection with the contact screw 93 and wire 94 leading to the coil 87 from which wire 95 leads to the wire 91.

When the system shown in Fig. 5 is to be used the switch is closed and held closed by hand for a few moments whereupon the magnet 87 will be energized and the switch will be locked, but should the current go off for a long enough time to allow the wire inside the protective apparatus to break the connection with the contact screw 93 the switch will be released by the latch 84. A suitable resistance R' is used to make certain that the coil receives enough current to energize it.

Having thus described my invention what I claim as new and desire to secure by Letters Patent of the United States, is as follows, modifications within the scope of the claims being expressly reserved:

1. A device for releasably holding a switch in an electric circuit in the closed position, comprising a rigid casing, a metallic conductor anchored at its ends and disposed within said casing, said conductor being in said circuit and being adapted to be heated by current therein, a spring bearing against said conductor intermediate its ends and tending to flex said conductor, and means actuated by the spring upon a predetermined flexing of the conductor to release said switch.

2. A device for releasably holding a switch in an electric circuit in the closed position, comprising means engaging the switch for holding it closed, a plunger operative to release said holding means, a conductor in said circuit adapted to be heated in proportion to the current flow in said circuit and a spring bearing against said conductor intermediate its ends and tending to flex said conductor, the spring operating on a predetermined flexure of the conductor to contact with and move the plunger to release the holding device.

3. A device for releasably holding a switch in an electric circuit in the closed position, comprising a casing, a conductor in said casing anchored at its ends and disposed in said circuit whereby it is heated by the current therein, heat insulating casings surrounding the conductor adjacent its ends, a spring engaging the conductor intermediate the casings and tending to flex it transversely in one direction and means adapted to be engaged by said spring to release the switch.

4. A device for releasably holding a switch in an electric circuit in closed position, comprising means for holding the switch closed, a flexible conductor in the circuit adapted to be heated by current therein, and means for flexing the conductor in one direction operative upon a predetermined flexure of said conductor for releasing said holding means.

In testimony whereof I have hereunto set my hand this 5th day of April, A. D. 1915, in the presence of the two subscribed witnesses.

SYDNEY N. BARUCH.

Witnesses:
C. P. GRIFFIN,
L. H. ANDERSON.